United States Patent [19]

Idosako et al.

[11] Patent Number: 5,509,748

[45] Date of Patent: Apr. 23, 1996

[54] BALL JOINT

[75] Inventors: Hidetaka Idosako; Takatsugu Masuno, both of Hamamatsu, Japan

[73] Assignee: Kabushiki Kaisha Somic Ishikawa, Tokyo, Japan

[21] Appl. No.: 284,081

[22] Filed: Aug. 1, 1994

[30]   Foreign Application Priority Data

Aug. 6, 1993 [JP] Japan .................. 5-43376 U

[51] Int. Cl.⁶ .................. F16D 1/12; F16C 11/00; F16C 23/04
[52] U.S. Cl. .................. 403/133; 403/122; 403/135; 384/203; 384/206
[58] Field of Search .................. 403/122, 124, 403/125, 126, 132, 133, 135, 140; 384/125, 206, 208, 202, 203; 464/170, 171, 178

[56]         References Cited

U.S. PATENT DOCUMENTS 5,188,477   2/1993   Idosako et al. .................. 403/133

FOREIGN PATENT DOCUMENTS

0020214   12/1980   European Pat. Off. .
0132598   2/1985    European Pat. Off. .
0213314   3/1987    European Pat. Off. .
0231479   8/1987    European Pat. Off. .
0442602   8/1991    European Pat. Off. .
4305994   9/1993    Germany .
1187187   4/1970    United Kingdom .

*Primary Examiner*—Kenneth J. Dorner
*Assistant Examiner*—Bruce A. Lev
*Attorney, Agent, or Firm*—Christopher R. Pastel; Thomas R. Morrison

[57]            ABSTRACT

A ball joint compensates for manufacturing tolerances of the components and functions smoothly under large compressive loads. A rigid and resilient bearing seat has an elastic restoring force that compensates for component tolerances under varying load conditions. A ball joint housing and fitted bearing seat permit incremental increases in the load bearing area within the ball joint as an operating load increases. The increase in load bearing area permits the ball joint to withstand larger loads than in conventional ball joints without permanent deformation of the bearing seat. The ball joint is more durable and operates more smoothly over a wider range of loads than conventional ball joints.

10 Claims, 6 Drawing Sheets

BALL JOINT

BACKGROUND

The present invention relates to a ball joint to be used, for example, in a steering mechanism or in a suspension mechanism of a vehicle.

A conventional ball joint typically includes a housing having an inner chamber into which a hard plastic bearing seat is fitted. A ball head of a ball stud is rotatably engaged in the bearing seat. A projecting stud section, which is integrally connected to the ball head, extends through an opening of the inner chamber. A plug, fitted into the opening, holds the bearing seat and the ball head in the inner chamber of the housing.

The above prior-art ball joint presents a problem in that it is difficult to absorb dimensional tolerances of the parts that comprise the housing, the bearing seat, the ball stud and the plug. As a result, it is difficult to stabilize the characteristics of a ball joint when it is assembled with a tie-rod or other mechanical part. The difficulty in controlling tolerances carries with it the danger that the bearing seat may wear prematurely and that rattling may occur with use due to permanent deformation of the bearing seat caused by high loads.

One approach to solving the above problems is disclosed in Japanese Patent Publication No. 44620-1978. A ball joint according to the above patent includes a ball head of a ball stud fitting into a bearing seat, which has both resiliency and rigidity. The slide surfaces of the seat have a radius of curvature larger than the diameter of the ball head. The ball head is slidably supported in the bearing seat by two annular slide surfaces along the inner surface of the bearing seat. The bearing seat is then slipped into an inner chamber of the ball joint's metallic housing. Both ends of the inner chamber are open. A sealing member is then pressed against an annular ridge at the opening through which the ball stud protrudes. A dome-shaped section of the bearing seat and of the housing is formed to substantially envelope the ball head. An elastic deformation occurs in the bearing seat as the dome-shaped section of the ball joint is formed.

The elastic restoring forces arising during the formation of the dome shaped section enable the ball joint to compensate for dimensional tolerances of the principal components, thereby ensuring a more uniform working torque and generally smoother operation. The bending deformation to form the dome-shaped section also relieves loads applied to the ball stud, thus enabling the ball stud to withstand higher loads.

A ball joint described in the above Japanese Patent Publication No 44620-1978 has a problem, however, when a large load or sustained heavy load is applied to its ball stud. The load bearing surfaces of the bearing seat are exposed to the increased load, which can cause permanent deformation and other damage to the bearing seat.

Another approach to solving the above problems is disclosed in U.S. Pat. No. 5,188,477. A ball joint according to the above patent includes a housing having an inner chamber with a hard plastic bearing seat and with an elastic member interposed between the bearing seat and a bottom of the inner chamber. The ball joint resiliently positions a section of its hard plastic bearing seat a short distance from a load-receiving section of its housing. As a compression load increases, the bearing seat comes into contact with the load-receiving section to limit the load absorbed by the elastic member. In this arrangement, the elastic member applies appropriate bearing pre-load to overcome manufacturing tolerances in the parts, without being required to support large compression loads.

A ball joint described in the above U.S. Patent has a problem with increased assembly time and costs with the need to fit and orient multiple parts into the inner chamber. Under compression loads for longer durations, the elastic member may be permanently deformed and lose its ability to compensate for dimensional tolerances when the compression load is lessened or removed. The materials used for the elastic member are likely to be more sensitive to damage by lubricants than the bearing seat material causing loss of resiliency with resulting loss in ability to compensate for the dimensional tolerances of the ball joint's parts as well as causing other damage to the ball joint.

OBJECTS AND SUMMARY OF THE INVENTION

Accordingly, it is an object of the invention to provide a ball joint which overcomes the drawbacks of the prior art.

It is a further object of the invention to provide a ball joint with high rigidity which compensates for the dimensional tolerances of principal component parts, the ball joint housing, the bearing seat, and the ball head.

It is a still further object of the invention to provide a ball joint which has superior load resistance and durability and which is easy to assemble and inexpensive to manufacture.

Briefly stated, a ball joint compensates for manufacturing tolerances of the components and functions smoothly under large compressive loads. A rigid and resilient bearing seat has an elastic restoring force that compensates for component tolerances under varying load conditions. A ball joint housing and fitted bearing seat permits incremental increases in the load bearing area within the ball joint as the operating load increases. The increase in load bearing area permits the ball joint to withstand larger loads than in conventional ball joints without permanent deformation of the bearing seat. The ball joint is more durable and operates more smoothly over a wider range of loads than conventional ball joints.

According to an embodiment of the invention, a ball joint includes a housing, a bearing seat in the housing, a ball stud, a ball on the ball stud secured in the bearing seat, a conical inner surface on the housing, a generally conical outer surface on the bearing seat, an annular concave section in the generally conical outer surface of the bearing seat, and a plurality of ribs in the annular concave section. Portions of the generally conical outer surface outside the annular concave section make contact with the conical inner surface and support the annular concave section out of contact with the conical inner surface. The plurality of ribs extend part way toward the conical inner surface so as to leave a space therebetween when the ball joint is in an unloaded condition, and the space is reducible to enable the bearing seat to absorb heavy loading without permanent deformation of the bearing seat.

According to an embodiment of the invention, the ball joint further includes a generally conical inner surface on the bearing seat, a first slide surface protruding from the generally conical inner surface, and portions of the first slide surface make one of linear contact and spot contact with the ball. The first slide surface has a radius of curvature greater than a radius of curvature of the ball. Portions of the first slide surface making linear contact with the ball may be congruent to the plurality of ribs or between adjacent ones of the plurality of ribs.

According to an embodiment of the invention, the ball joint further includes a cylindrical inner surface on the housing, a generally cylindrical outer surface on the bearing seat, a generally cylindrical inner surface on the bearing seat, a second slide surface protruding from the generally cylindrical inner surface of the bearing seat, and portions of the second slide surface make one of linear and spot contact with the ball. The second slide surface has a radius of curvature substantially identical to a radius of curvature of the ball.

According to an embodiment of the invention, a ball joint includes a housing, a bearing seat in the housing, a ball stud, a ball on the ball stud secured in the bearing seat, a conical inner surface on the housing, a generally conical outer surface on the bearing seat which makes contact with the conical inner surface, a conical depression centered on a bottom surface of the housing, a buffer surface on an end of the bearing seat adjacent to the conical depression with the buffer surface extending over the conical depression leaving a space therebetween in an unloaded condition of the ball joint, and the space being reducible to enable the bearing seat to absorb heavy loading without permanent deformation of the bearing seat.

According to an embodiment of the invention, a ball joint includes a housing, a bearing seat in the housing, a ball stud, a ball on the ball stud secured in the bearing seat, a conical inner surface on the housing, a generally conical outer surface on the bearing seat, an annular concave section in the generally conical outer surface, with portions of the generally conical outer surface outside the annular concave section making contact with the conical inner surface and supporting the annular concave section out of contact with the conical inner surface, a plurality of ribs in the annular concave section extending part way toward the conical inner surface to leave a first space therebetween in an unloaded condition of the ball joint, a conical depression centered on a bottom surface of the housing, a buffer surface on an end of the bearing seat adjacent to the conical depression and extending over the conical depression leaving a second space therebetween when the ball joint is in an unloaded condition, and the first and second spaces being reducible to enable the bearing seat to absorb heavy loading of the ball joint without permanent deformation of the bearing seat.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 7:
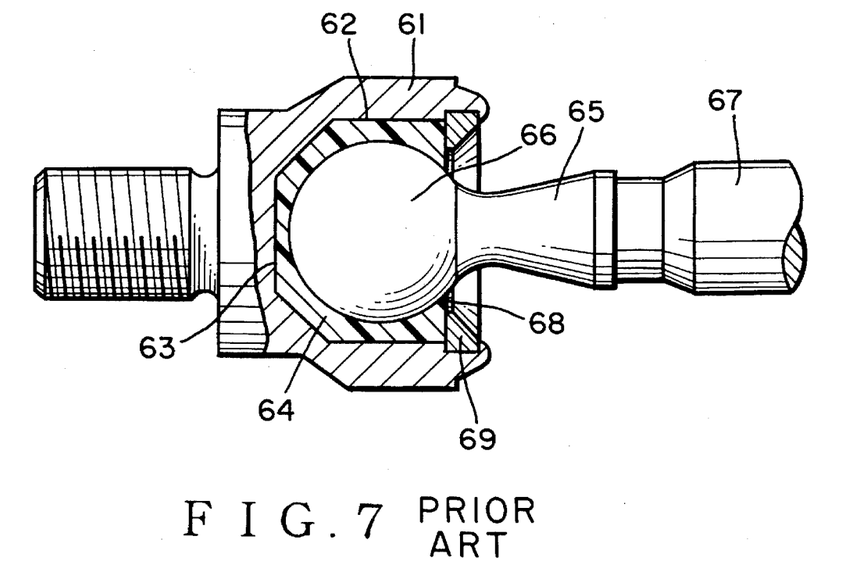
FIG. 7 is an enlarged cross-section of part of an embodiment of a ball joint according to the prior art.

Referring to FIG. 7, a conventional ball joint includes a housing 61 having an inner chamber 62 which contains a hard plastic bearing seat 64. A ball head 66 of a ball stud 65 is slidably engaged in bearing seat 64. A projecting stud section 67, which is integrally connected to ball head 66, extends through an opening 68 of inner chamber 62. A plug 69 fits into opening 68 and holds bearing seat 64 and ball head 66 in housing 61.

Such a ball joint has a problem with absorbing dimensional tolerances of the parts that comprise housing 61, bearing seat 64, ball stud 65, and plug 69. Loose tolerances cause bearing seat 64 to wear prematurely and permanently changes the set of bearing seat 64 on a bottom 63 from overloading.

Figure 8:
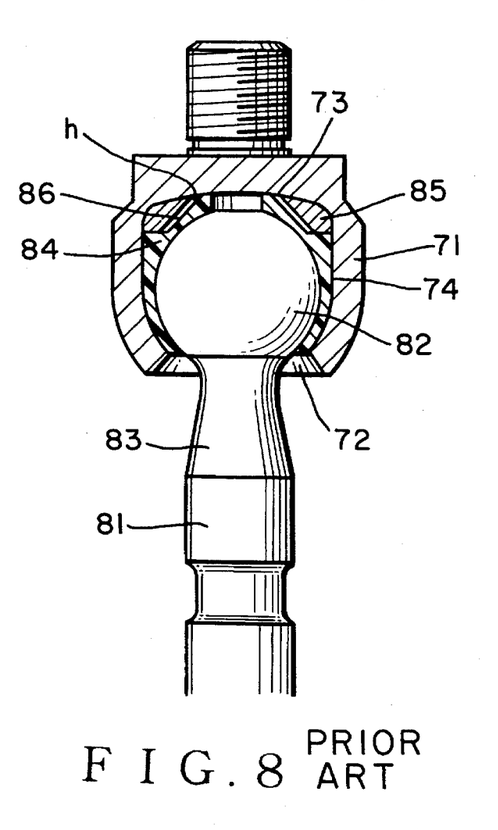
FIG. 8 is an enlarged cross-section of a part of a ball joint according to the prior art.

Referring to FIG. 8, a ball joint according to the prior art (U.S. Pat. No. 5,188,477) includes a housing 71 having an inner chamber 74 which contains a hard plastic bearing seat 84 and an elastic member 85. A ball head 82 of a ball stud 81 is slidably engaged in bearing seat 84. Elastic member 85 fits between bearing seat 84 and bottom 73 of inner chamber 74. Ball stud 81 projects through opening 72 of inner chamber 74. Under minimum loads, a space h is maintained between a surface 86 of bearing seat 84 and bottom 73. Maximum loads for extended periods of time cause permanent deformation of elastic member 85 thereby degrading the ability of the joint to compensate for varying loads.

Figure 1:
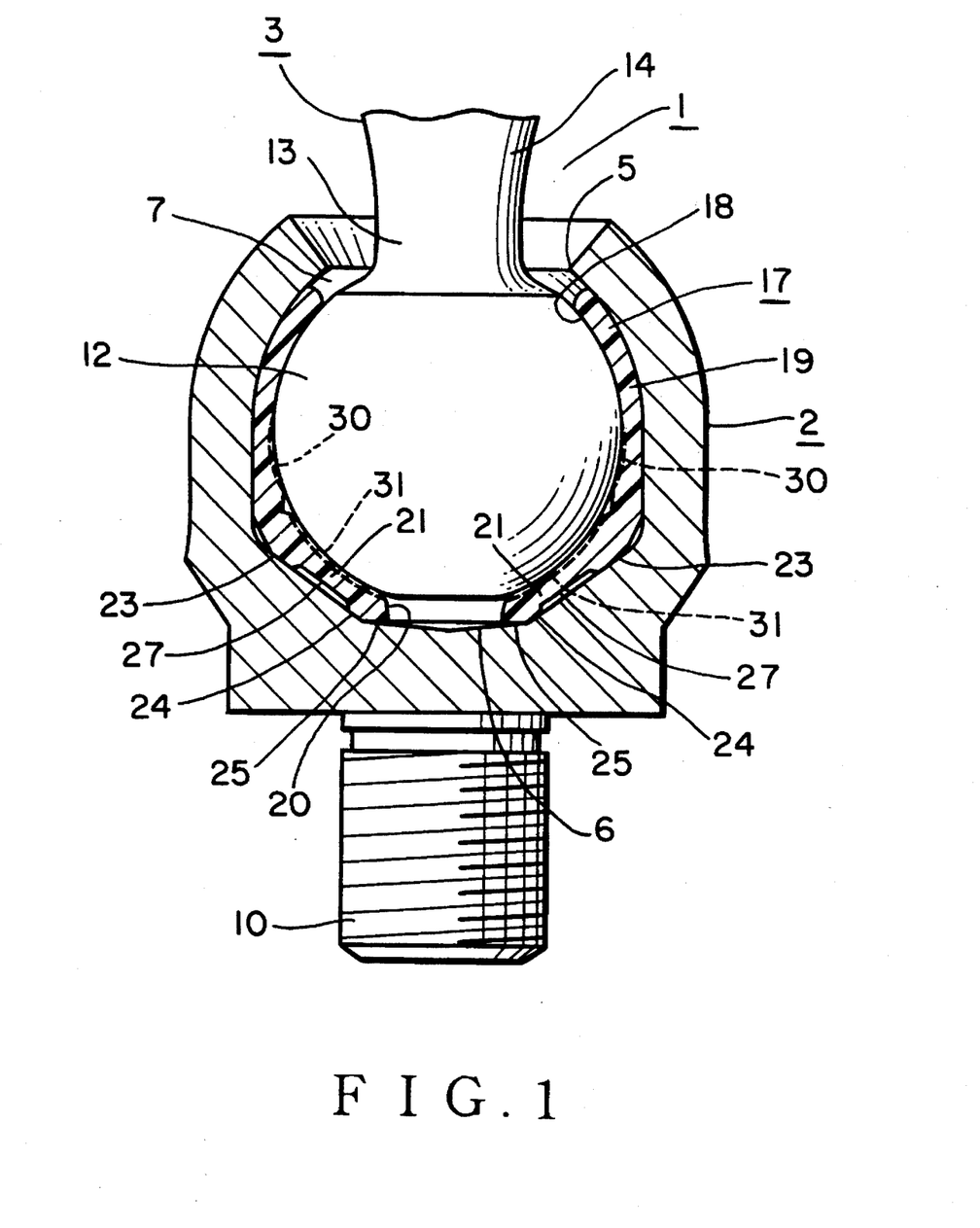
FIG. 1 is an enlarged cross-section of a ball joint according to an embodiment of the present invention.

Referring to FIG. 1, a ball joint 1 includes a cylindrical metal housing 2 having an inner chamber 7 containing a hard, resilient plastic bearing seat 17 which substantially envelopes a ball head 12 of a metal ball stud 3. A screw section 10 is appended to housing 2 to attach ball joint 1 to a larger system in which it functions, for example, a tie-rod assembly in a vehicle suspension.

Housing 2 has an opening 5 which is swaged during assembly to retain bearing seat 17 and ball head 12 within inner chamber 7. Ball stud body 14 of ball stud 3 extends through opening 5. Ball stud body 14 includes a smaller diameter section 13. Opposite opening 5 and essentially concentric therewith is a bottom 6 of inner chamber 7. Loads on ball stud 3 are transferred through bearing seat 17 to bottom 6.

Bearing seat 17 has a cylindrical wall section 19 with a large opening 18 at an end to accept ball head 12 during assembly. Opposite opening 18, an integrally formed bottom section 21 connects to cylindrical wall section 19. When housing 2 is swaged during assembly cylindrical wall section 19 and bottom section 21 are elastically deformed. The elastic restoring forces push against ball head 12 compensating for dimensional tolerances of ball head 12, housing 2 and bearing seat 17.

First and second annular load bearing sections 23 and 24 lie on a surface of bottom section 21 facing bottom 6 of inner chamber 7. Bottom section 21 of bearing seat 17 has a hole 20. A buffer surface 25 surrounds hole 20 facing bottom 6. An annular concave section 27 is between first and second annular load bearing sections 23 and 24. Under load, deformation of bottom section 21 predominately occurs between first and second annular load bearing sections 23 and 24, since the thickness of bottom section 21 is less in the region of annular concave section 27.

A first slide surface 31 faces ball head 12 protruding from bottom section 21. A second slide surface 30 protrudes from cylindrical wall section 19 facing ball head 12. Second slide surface 30 is below center of ball head 12. Slide surfaces 30 and 31 are forced into contact with ball head 12 by elastic restoring forces described above. Second slide surface 30 and first slide surface 31 are not continuous surfaces. They are defined by a number of individual line-type contacts with ball head 12. Dots or other geometric arrangement could also be used.

Figure 2:
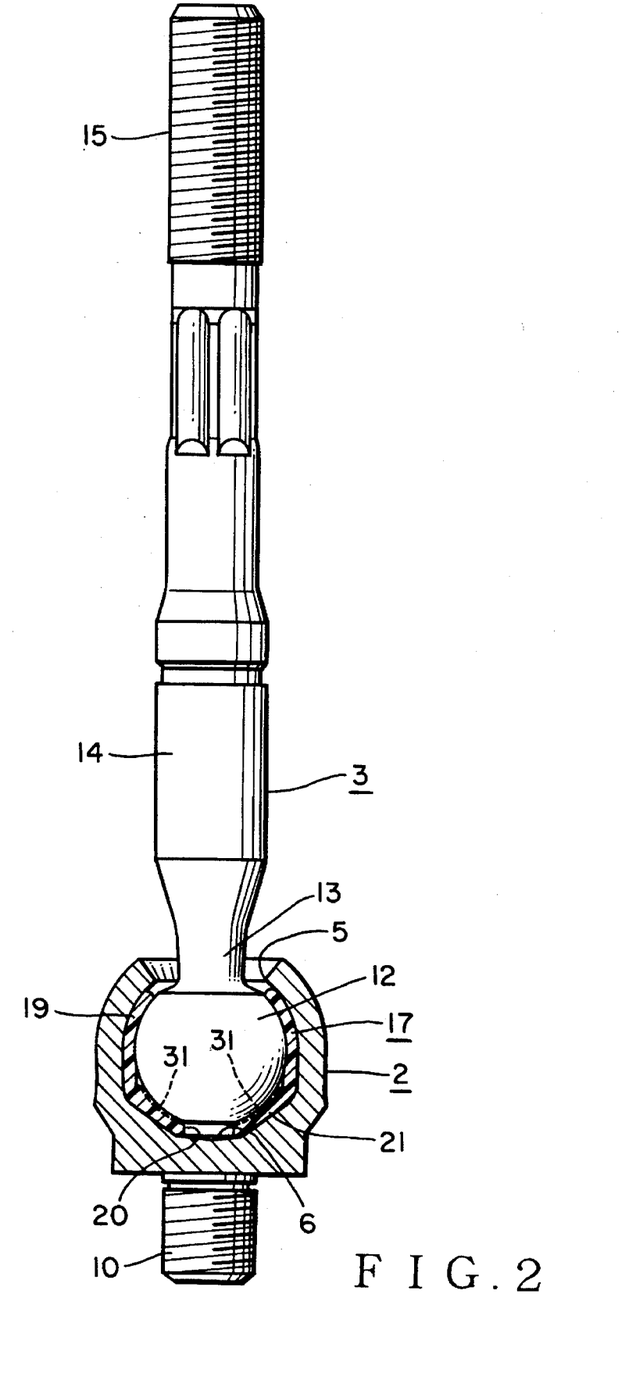
FIG. 2 is a partially cut-out side view of a ball joint according to an embodiment of the present invention.

Referring also to FIG. 2, selected features from FIG. 1 are repeated along with a full length view of ball stud 3. Ball stud 3 is terminated, opposite ball head 12, with an externally threaded section 15 which together with screw section 10 permit ball joint 1 to be incorporated into a larger assembly.

Figure 3:
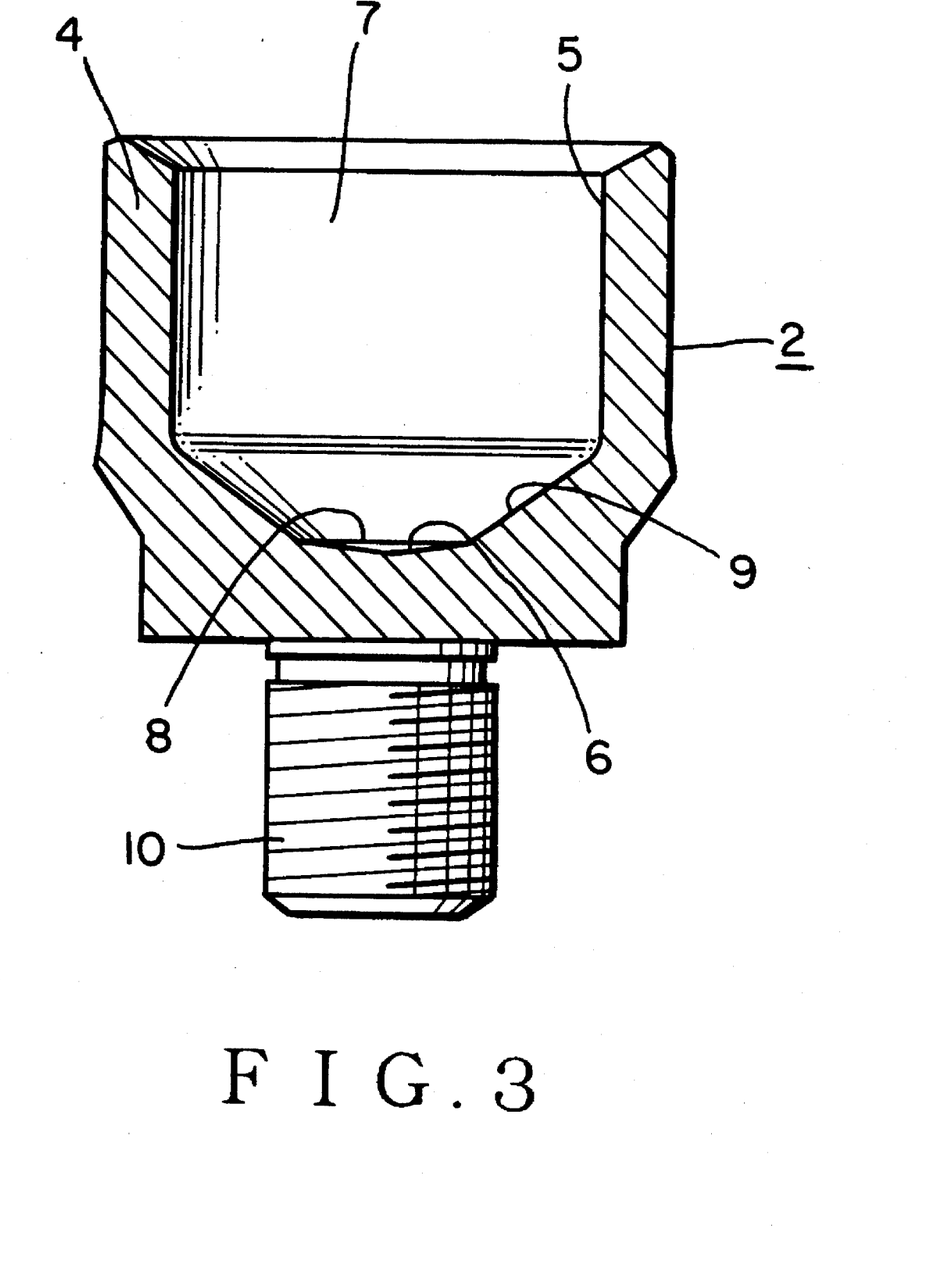
FIG. 3 is a cross-section of a housing of a ball joint according to an embodiment of the present invention before assembly.
Figure 4:
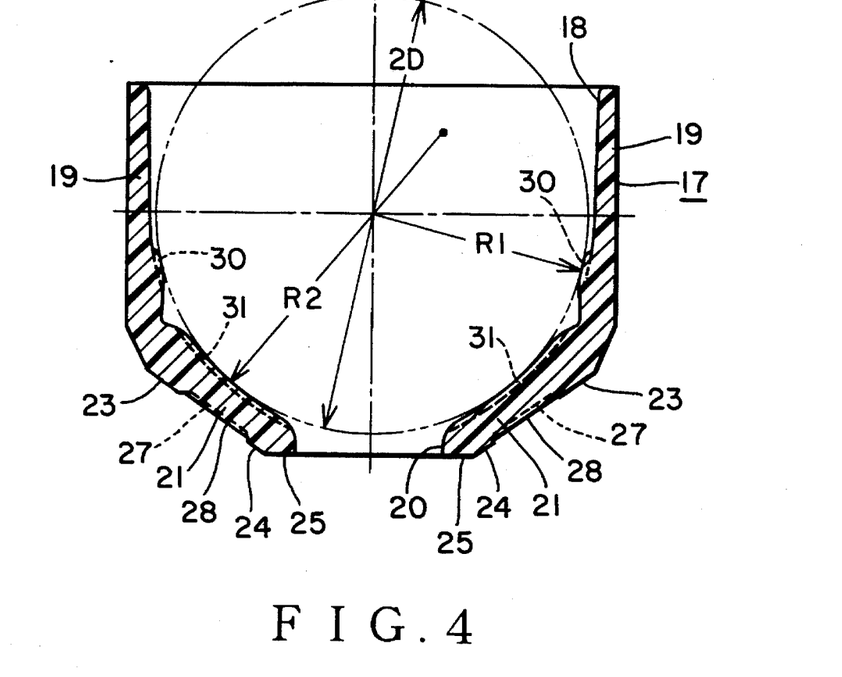
FIG. 4 is a cross-section of a bearing seat of a ball joint according to an embodiment of the present invention before assembly.
Figure 5:
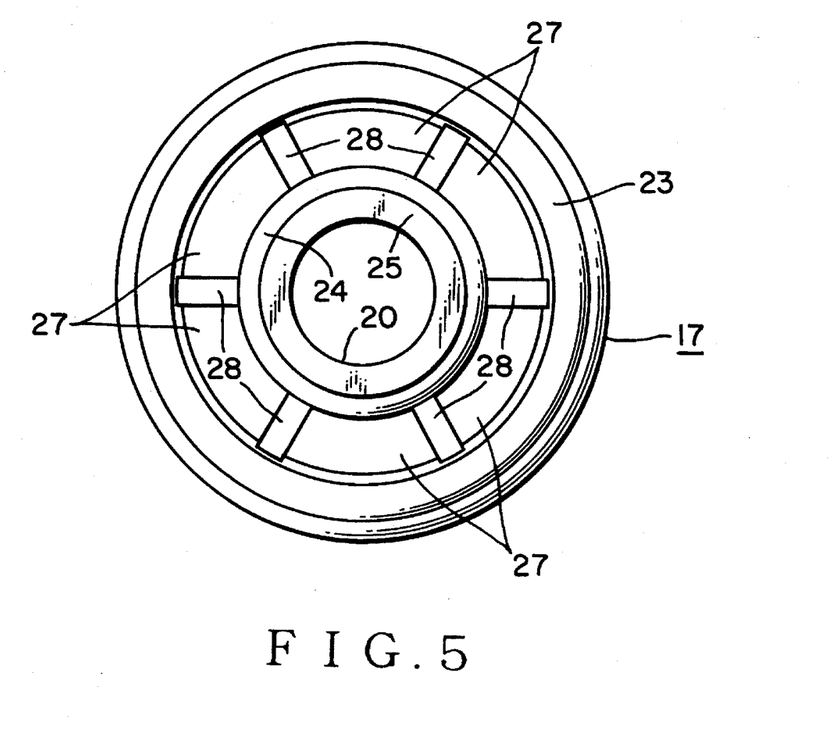
FIG. 5 is a bottom view of the bearing seat of FIG. 4.

FIGS. 3–5 present detailed features of housing 2 and bearing seat 17 prior to assembly.

Referring to FIGS. 1 and 3, inner chamber 7 of housing 2 is essentially a cylindrical section 4 with a bottom 6. At the center of bottom 6, a conical depression 8 with concave walls is formed. A conical surface 9 mates the outer rim of conical depression 8 to cylindrical section 4 of inner chamber 7. Conical surface 9 arcs away from the interior. Under load conditions, it supports the load transferred from the bearing seat 17.

Referring to FIG. 4, further details are shown of bearing seat 17 which is made of a hard, resilient synthetic resin having a high load resistance and good load bearing characteristics, such as polyacetal. Bearing seat 17 fits into inner chamber 7 of housing 2 through opening 5, shown in FIG. 3.

An image of ball head 12 with a radius of D is projected onto bearing seat 17 in FIG. 4. Hole 20 in bottom section 21 has a diameter which is smaller than radius D of ball head 12. Second slide surface 30 protrudes from cylindrical wall section 19 slightly above where bottom section 21 meets cylindrical section 19. Radius of curvature R1 of second slide surface 30 is virtually identical to radius D of ball head 12 of ball stud 3. Second slide surface 30 consists of a number of linear protrusions arranged pointing radially outward from the center of bottom section 21. First slide surface 31, which protrudes from bottom section 21, has a radius of curvature R2 that is greater than radius D of ball head 12. First slide surface 31 consists of a series of linear protrusions, arranged pointing radially outward from the center of bottom section 21. In operation, ball head 12 slides against second slide surface 30 on a series of point contacts forming an annulus. Ball head 12 slides against first slide surface 31 on a series of linear or point contacts forming a portion of a spherical surface.

Contacts of ball head 12 on first slide surface 31 are congruent with ribs 28. Ribs 28 span annular concave section 27, and when in a no-load condition, remain out of contact with housing 2. Ribs 28 do not extend beyond annular concave section 27. Under loads, surfaces of ribs 28 may be forced into contact with conical surface 9 of housing 2, and under even greater loads, an inner surface of annular concave section 27 makes contact with conical surface 9, shown in FIG. 3.

Referring also to FIG. 5, ribs 28 uniformly divide annular concave section 27 in a radial fashion. In one embodiment of the invention, first and second slide surfaces 30 and 31 (not shown in FIG. 5), are linear protrusions on the inside of bearing seat 17, aligned with ribs 28. In another embodiment, first and second slide surfaces 30 and 31 are dot-type protrusions. In a still further embodiment of the invention, first and second slide surfaces 30 and 31 are linear or dot-type protrusions located between adjacent pairs of ribs 28. In normal operation of ball joint 1, first and second annular load bearing sections 23 and 24 and buffer surface 25 at least partially make contact with bottom 6 of housing 2. Under higher loads, portions of ribs 28 and annular concave section 27 also make contact with bottom 6.

Figure 6:
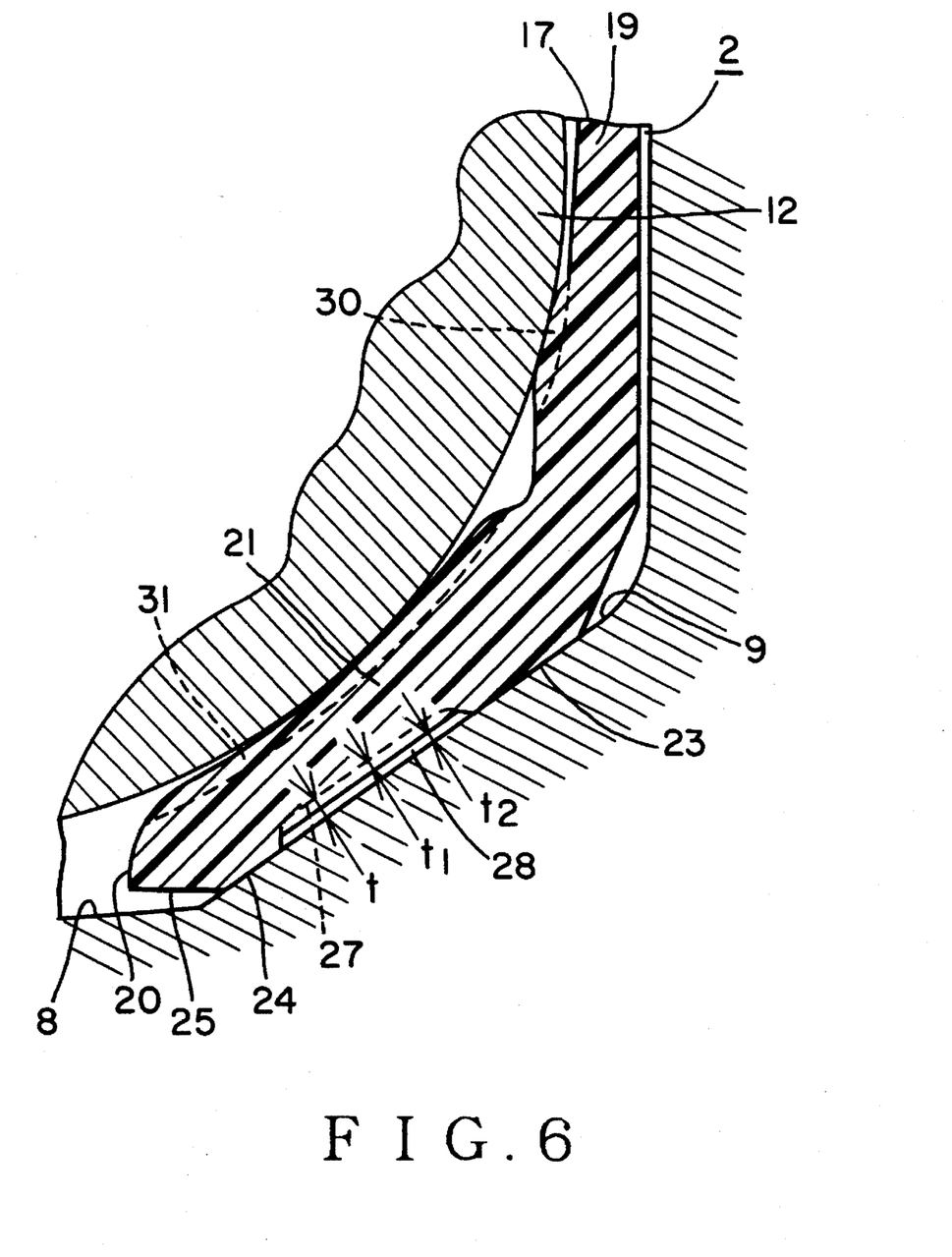
FIG. 6 is a fragmentary sectional view of the contact points between the ball head, the bearing seat, and the housing of the ball joint of FIG. 1.

Referring to FIGS. 1 and 6, buffer surface 25 faces conical depression 8 at bottom 6 of inner chamber 7. A space exists between buffer surface 25 and conical depression 8 when ball joint 1 is not under load. Ball head 12 makes contact with bearing seat 17 at first and second slide surfaces 30 and 31. First and second annular load bearing surfaces 23 and 24 make contact with conical surface 9 of housing 2. Annular concave section 27 of depth t and ribs of height t1 which span annular concave section 27 face conical surface 9 in bottom 6 of housing 2. A space t2 separates conical surface 9 from ribs 28. When ball joint 1 is not under load, space t2 equals at least the difference between depth t of concave section 27 and height t1 of ribs 28. Under high loads, buffer surface 25 makes contact with conical depression 8 and space t2 eventually diminishes to zero.

The improvements offered by this embodiment of the present invention are illustrated by describing the functioning of ball joint 1 under normal and high load conditions.

Under low loads (FIGS. 1 and 6) ball head 12 of ball stud 3 makes contact with second slide surface 30 and first slide surface 31. Contact with first slide surface 31 is opposite first and second annular load bearing sections 23 and 24 on outer surface of bottom section 21, which in turn make contact with conical surface 9 of bottom 6 of housing 2. Ribs 28 spanning annular concave section 27 and facing conical surface 9 of housing 2 do not make contact with surface 9 under such loads. The space between conical surface 9 and ribs 28 remains approximately t2.

The swaged upper section of housing 2 forces contact between the upper half of ball head 12 and the inner wall of upper cylindrical section 19 of bearing seat 17. Swaging housing 2 also causes bottom section 21 of bearing seat 17 to elastically deform so that buffer surface 25 of bottom section 21 partially touches or comes closer to the surface of conical depression 8 of housing 2. This action compensates for dimensional tolerances of ball head 12, housing 2, and bearing seat 17 and creates a snug fit for ball head 12. Furthermore, the bending deformation creates an elastic restoring force in bottom section 21 of bearing seat 17. The restoring force pushes against ball head 12, generating some slide resistance during operation. Operating torque is stabilized and ball joint 1 functions smoothly. An advantage of the present invention is that ball joint 1 can compensate for greater dimensional tolerances in the components due to a larger space of varying depth between conical depression 8 in bottom 6 of housing 2 and buffer surface 25 of bottom section 21 of bearing seat 17.

A major advantage of the present invention is demonstrated when a heavy load, especially a large compression load, is applied to ball stud 3. As the load increases, bottom section 21 elastically deforms further creating additional restoring force to compensate for the increased load. Essentially simultaneously, ribs 28 in annular concave section 27 make contact with surface 9 of bottom 6 of housing 2, and more of buffer surface 25 makes contact with the surface of conical depression 8 of housing 2. First and second annular load-bearing sections 23 and 24, ribs 28, and portions of buffer surface 25, each of bearing seat 17, transfer load to sections of housing 2. Load bearing area thus increases. Permanent deformation and damage to bearing seat 17 is diminished. Durability is improved. Ball joint 1 can thus withstand larger loads for longer periods of time than can current state of the art ball joints.

A further advantage of the present invention is that it simplifies assembly of ball joint 1 and also reduces production costs. Because it is made from a hard, resilient synthetic resin, bearing seat 17, with its many different surfaces and shapes, can be formed of one piece, for example by injection molding. This reduces the number of necessary members compared to other ball joints and simplifies assembly.

A still further advantage of the current invention is that it is easier to supply lubricant to the surface of ball head 12. This benefit arises from having first and second slide surfaces 30 and 31 protrude from the underlying bearing seat structure. Spaces form between individual protrusions, making up the two slide surfaces, and the outer surface of ball head 12. Lubricants can be introduced and allowed to spread over ball head 12. This further ensures smooth and stable operation of ball joint 1.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint, comprising:
   a housing;
   a bearing seat in said housing;
   a ball stud;
   a ball on said ball stud secured in said bearing seat;
   a conical inner surface in said housing;
   a generally conical outer surface on said bearing seat;
   an annular concave section in said generally conical outer surface of said bearing seat;
   portions of said generally conical outer surface outside said annular concave section contacting said conical inner surface, and supporting said annular concave section out of contact with said conical inner surface;
   a plurality of ribs in said annular concave section;
   said plurality of ribs extending part way toward said conical inner surface, to leave a space therebetween in an unloaded condition of said ball joint; and
   said space being reducible to enable said bearing seat to absorb heavy loading without permanent deformation of said bearing seat.

2. A device according to claim 1, further comprising:
   a generally conical inner surface in said bearing seat;
   a first slide surface protruding from said generally conical inner surface; and
   portions of said first slide surface making spot contact with said ball.

3. A device according to claim 1, further comprising:
   a generally conical inner surface in said bearing seat;
   a first slide surface protruding from said generally conical inner surface; and
   portions of said first slide surface making linear contact with said ball.

4. A device according to claim 3, wherein said first slide surface has a radius of curvature greater than a radius of curvature of said ball.

5. A device according to claim 3, wherein said portions of said first slide surface making linear contact with said ball are congruent to said plurality of ribs.

6. A device according to claim 3, wherein said portions of said first slide surface making linear contact with said ball are between adjacent ones of said plurality of ribs.

7. A device according to claim 3, further comprising:
   a cylindrical inner surface in said housing;
   a generally cylindrical outer surface on said bearing seat;
   a generally cylindrical inner surface in said bearing seat;
   a second slide surface protruding from said generally cylindrical inner surface of said bearing seat; and
   portions of said second slide surface making one of linear and spot contact with said ball.

8. A device according to claim 7, wherein said second slide surface has a radius of curvature substantially identical to a radius of curvature of said ball.

9. A ball joint, comprising:
   a housing;
   a bearing seat in said housing;
   a ball stud;
   a ball on said ball stud secured in said bearing seat;
   a conical inner surface in said housing;
   a generally conical outer surface on said bearing seat;
   said generally conical outer surface contacting said conical inner surface;
   a conical depression centered on a bottom surface of said housing;
   a buffer surface on an end of said bearing seat adjacent to said conical depression;
   said buffer surface extending over said conical depression leaving a space therebetween in an unloaded condition of said ball joint; and
   said space being reducible to enable said bearing seat to absorb heavy loading without permanent deformation of said bearing seat.

10. A ball joint, comprising:
    a housing;
    a bearing seat in said housing;
    a ball stud;
    a ball on said ball stud secured in said bearing seat;
    a conical inner surface in said housing;
    a generally conical outer surface on said bearing seat;
    an annular concave section in said generally conical outer surface;
    portions of said generally conical outer surface outside said annular concave section contacting said conical inner surface, and supporting said annular concave section out of contact with said conical inner surface;
    a plurality of ribs in said annular concave section;
    said plurality of ribs extending part way toward said conical inner surface, to leave a first space therebetween in an unloaded condition of said ball joint;
    a conical depression centered on a bottom surface of said housing;
    a buffer surface on an end of said bearing seat adjacent to said conical depression and extending over said conical depression leaving a second space therebetween in said unloaded condition of said ball joint; and
    said first and second spaces being reducible to enable said bearing seat to absorb heavy loading of said ball joint without permanent deformation of said bearing seat.

* * * * *